US008965852B2

(12) United States Patent
Jayaraman (10) Patent No.: US 8,965,852 B2
(45) Date of Patent: Feb. 24, 2015

(54) METHODS AND APPARATUS FOR NETWORK EFFICIENT DEDUPLICATION (75) Inventor: Vinod Jayaraman, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 12/954,348

(22) Filed: Nov. 24, 2010

(65) Prior Publication Data
US 2011/0125720 A1 May 26, 2011

Related U.S. Application Data (60) Provisional application No. 61/264,233, filed on Nov. 24, 2009.

(51) Int. Cl.
G06F 7/00 (2006.01)
G06F 17/00 (2006.01)
G06F 17/30 (2006.01)

(52) U.S. Cl.
CPC .............. G06F 17/30156 (2013.01)
USPC ........................... 707/664; 707/692

(58) Field of Classification Search
CPC .......... G06F 17/30156; G06F 17/3015; G06F 17/30489; G06F 3/0641; G06F 11/1453
USPC .......... 707/664, 672, 673, 692, 697; 713/324; 711/161, 162, 170
See application file for complete search history.

(56) References Cited

U.S. PATENT DOCUMENTS

| 2008/0133561 A1* | 6/2008 | Dubnicki et al. ............. 707/101 |
| 2009/0063795 A1* | 3/2009 | Yueh ............................ 711/162 |
| 2010/0094817 A1* | 4/2010 | Ben-Shaul et al. ........... 707/697 |
| 2010/0121825 A1* | 5/2010 | Bates et al. ................... 707/692 |
| 2011/0066628 A1* | 3/2011 | Jayaraman ................... 707/758 |
| 2012/0017054 A1* | 1/2012 | Arai et al. ..................... 711/154 |

OTHER PUBLICATIONS

Srinivasan, Kiran et al., "iDedup: Latency-aware, inline data deduplication for primary storage", *NetApp, Inc.* , [Online]. Retrieved from the Internet: <http://static.usenix.org/events/fast12/tech/full_papers/Srinivasan.pdf >,(Accessed on May 23, 2012), 14 pgs.
"EMC Data Domain Global Deduplication Array", *EMC Corporation*, [Online]. Retrieved from the Internet: <http://www.datadomain.com/pdf/DataDomain-GlobalDeduplicationArray-Datasheet.pdf > Accessed on May 30, 2012,(2011),4 pgs.

\* cited by examiner

*Primary Examiner* — Md. I Uddin
(74) *Attorney, Agent, or Firm* — Kwan & Olynick LLP (57) ABSTRACT Mechanisms are provided for performing network efficient deduplication. Segments are extracted from files received for deduplication at a host connected to a target over one or more networks and/or fabrics in a deduplication system. Segment identifiers (IDs) are determined and compared with segment IDs for segments already deduplicated. Segments already deduplicated need not be transmitted to a target system. References and reference counts are modified at a target system. Updating references and reference counts may involve modifying filemaps, dictionaries, and datastore suitcases for both already deduplicated and not already deduplicated segments.

16 Claims, 7 Drawing Sheets

Figure 1A

| Data A | Data B | Data C | File X 171 |
|--------|--------|--------|------------|
| Data D | Data B | Data C | File Y 173 |
| Data D | Data B | Data E | File Z 175 |

| Filemap File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| Data Table 251 | | |
| Index 253 | Data Offset 255 | Data Reference Count 257 |
| 1 | Offset-Data A | 1 |
| 2 | Offset-Data B | 1 |
| 3 | Offset-Data C | 1 |
| Datastore | | |
| | Data 261 | Last File 263 |
| 1 | Data A | File X 201 |
| 2 | Data B | File X 201 |
| 3 | Data C | File X 201 |

Figure 3

| Dictionary 301 ||
|---|---|
| Hash 311 | Storage Location 321 |
| a | Location 323 |
| b | Location 325 |
| c | Location 327 |

| Dictionary 351 ||
|---|---|
| Hash 361 | Storage Location 371 |
| i | Location 373 |
| j | Location 375 |
| k | Location 377 |

METHODS AND APPARATUS FOR NETWORK EFFICIENT DEDUPLICATION

CROSS-REFERENCE TO RELATED APPLICATION

This application claims the benefit under 35 U.S.C. 119(e) of U.S. Provisional Application No. 61/264,233 filed Nov. 24, 2009 and titled "METHODS AND APPARATUS FOR NETWORK EFFICIENT DEDUPLICATION", all of which is incorporated herein by this reference in its entirety for all purposes.

TECHNICAL FIELD

The present disclosure relates to performing efficient deduplication over one or more networks.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or a hash of the actual data. Once the segment ID is generated, it can be used to determine if the data segment already exists in the system. If the data segment does exist, it need not be stored again. The reference count for the single instance data segment is incremented and some form of file mapping construct is used to associate the deduplicated segment from a particular file to the single instance stored in the storage system.

However, mechanisms for performing deduplication are limited. Consequently, mechanisms are provided for improving the efficiency of deduplication when compression is also used.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular network architectures. However, it should be noted that the techniques and mechanisms of the present invention apply to a variety of different network architectures. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for performing network efficient deduplication. Segments are extracted from files received for deduplication at a host connected to a target over one or more networks and/or fabrics in a deduplication system. Segment identifiers (IDs) are determined and compared with segment IDs for segments already deduplicated. Segments already deduplicated need not be transmitted to a target system. References and reference counts are modified at a target system. Updating references and reference counts may involve modifying filemaps, dictionaries, and datastore suitcases for both already deduplicated and not already deduplicated segments.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compressions algorithms operate in a variety of manners, but many compression algorithms analyze data to determine source sequences in data that can be mapped to shorter code words. In many implementations, the most frequent source sequences or the most frequent long source sequences are replaced with the shortest possible code words.

Data deduplication reduces storage footprints by reducing the amount of redundant data. Deduplication may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a fixed or sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a NAS drive that a user can manipulate to backup and archive files.

It is also possible that the source of the backup is a deduplicated storage subsystem which is being backed up to another deduplicated storage subsystem. In this situation and in other situations, it is the source storage subsystem that will reduplicate blocks when it sends the data to the backup storage. The data blocks stored on the source system will remain deduplicated. But as files are read and sent over the network, each file is sent as a completely intact file, consuming valuable network resources.

Conventional deduplication storage systems require all the data be sent to the target before it can be determined which data segments are duplicates and need not be stored. For example, consider a 10 TB data set which is to be backed up to a deduplicating storage sub-system. Because of previous backups which are stored on the de-duplicating storage subsystem, 5 TB may already be held within the storage subsystem. However, the entire 10 TB must be sent to the deduplicating storage subsystem before it is determined that only 5 of the 10 TB need be stored.

The techniques and mechanisms of the present invention improve network efficiency in deduplication systems. Multiple files within the stream will reference the same data segment if the data segment is deduplicated. By not reduplicating blocks in the backup stream, network resource consumption will be reduced. In addition to maintaining the deduplication in the backup stream, a mechanism has been created which allows the source system to determine if a data segment is already present on the target system.

According to various embodiments, a data management application receives files for optimization. Segment identifiers (IDs) are determined for segments in the files received for optimization. In particular embodiments, it is determined whether the segments have already been deduplicated or are already maintained at a target system. In some examples, information about segment IDs already deduplicated is provided by a target system to a host system. In other examples, a host contacts the target to request specific information about a particular segment. If the segment already exists in the target system, the segment need not be transmitted over the network. Instead, references and reference counts can be modified at the target system to reflect an additional reference to the deduplicated segment. If the segment does not already exist in the target system, the segment is transmitted for deduplication.

By not reduplicating data in the backup stream and by determining what data segments are already present on the target system, network bandwidth utilization for backup can be significantly reduced. Additionally, the backup window can also be reduced.

Figure 1A:
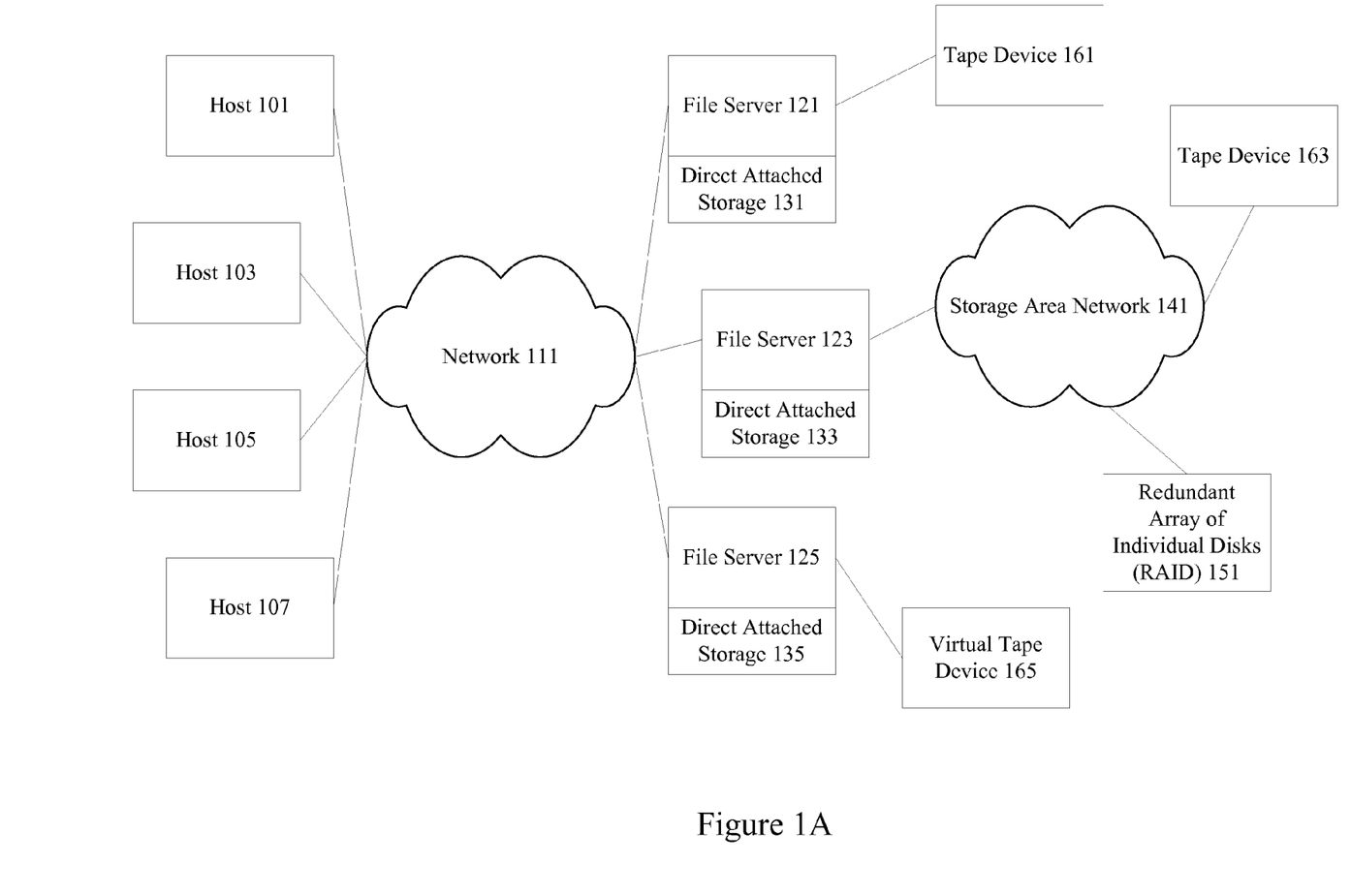
FIG. 1A illustrates a particular example of network that can use the techniques and mechanisms of the present invention.

FIG. 1A illustrates a particular example of a network that can use the techniques and mechanisms of the present invention. Hosts 101, 103, 105, and 107 are connected to file servers 121, 123, and 125 through a network 111. Hosts may include computer systems, application servers, devices, etc. A network 111 may be a single network or a combination of different networks. According to various embodiments, each host 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, hosts 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow hosts 101, 103, 105, and 107 to access data at the file level. The file servers 121, 123, and 125 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a segment ID index may be implemented at hosts 101, 103, 105, and 107, at network 111, or at file servers 121, 123, and 125 or at a combination of entities. The segment ID generator intercepts requests to store a data segment and determines whether the data segment has already been stored at a target system. For example, if a client associated with host 101 requests deduplication of multiple files in a directory, the segment ID generator determines what segments in the multiple files have already been deduplicated. For segments already deduplicated, references and reference counts may be updated, but the data segments need not be transmitted again to the target system for deduplication. The determination can be made by comparing segment IDs or hashes of segments for deduplication.

Figure 1B:
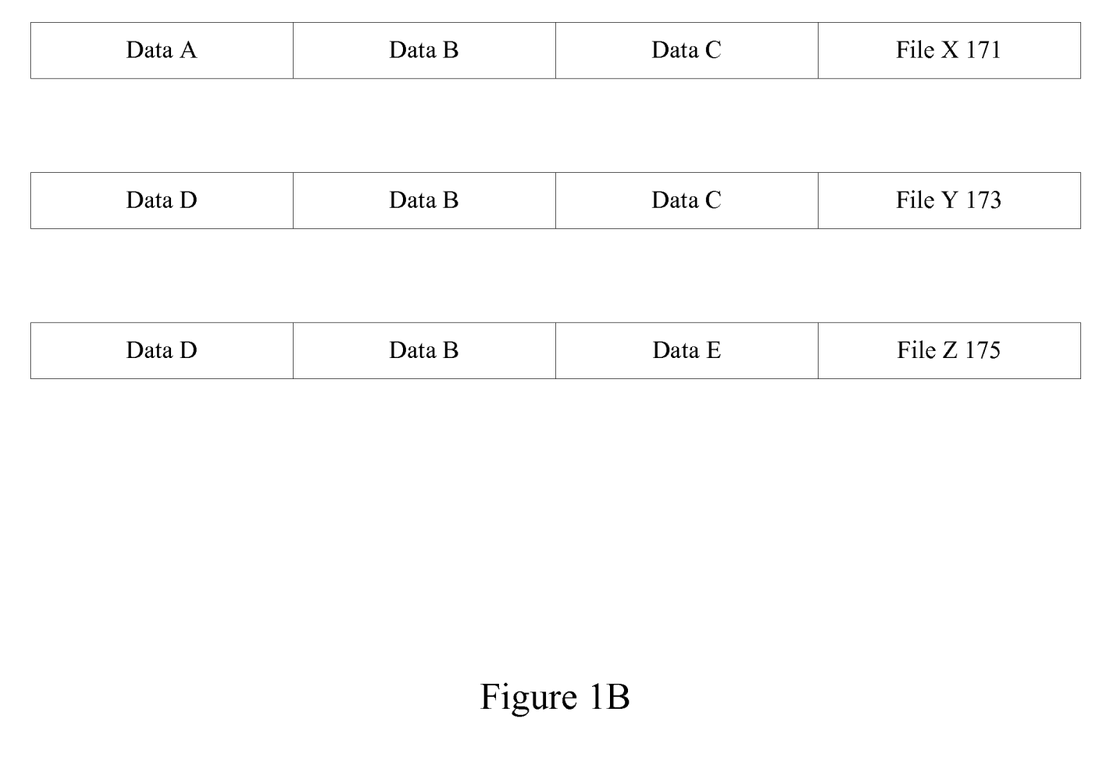
FIG. 1B illustrates a particular example of files and data segments.

FIG. 1B illustrates examples of files and data segments. According to various embodiments, file X 171 includes data A, data B, and data C. File Y 173 includes data D, data B, and data C. File Z 175 includes data D, data B, and data E. According to various embodiments, each data segment is 8K in size. The three files include five different segments A, B, C, D, and E. Files X 171, Y 173, and Z 175 can be deduplicated to remove redundancy in storing the different segments. For example, data B need only be stored once instead of three times. Data C and data D need only be stored once instead of twice. To further improve storage efficiency, each data segment is also compressed with segment specific compression contexts. A variety of compression algorithms may be applied to each segment.

Figure 2A:
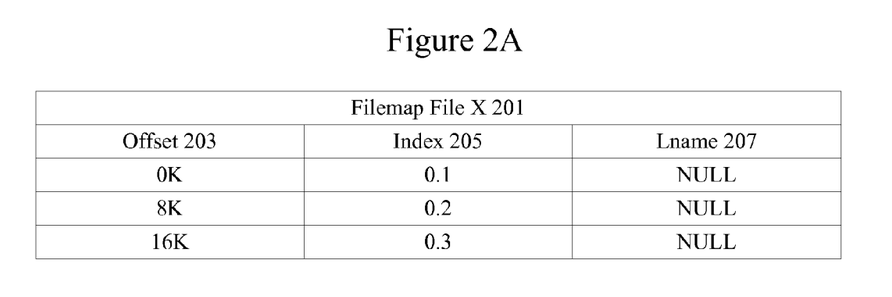
FIG. 2A illustrates a particular example of a filemap.
Figure 2B:
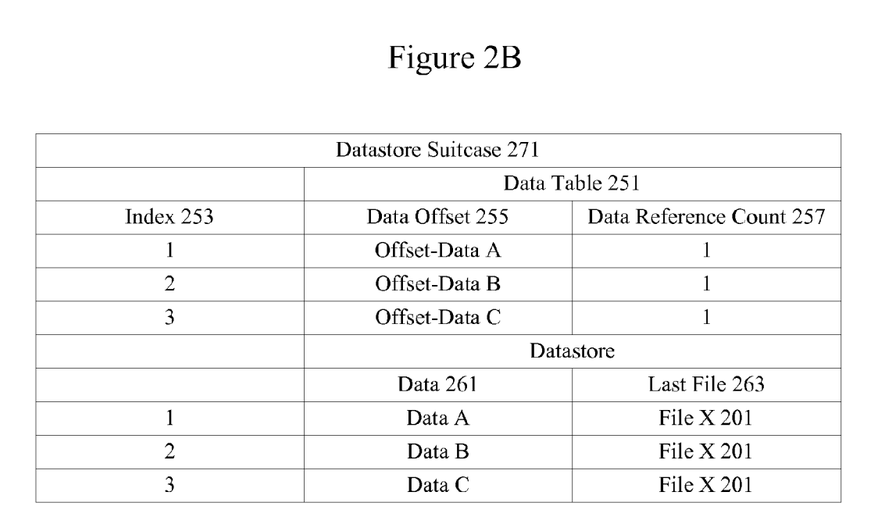
FIG. 2B illustrates a particular example of a datastore suitcase.

FIG. 2A illustrates one example of a filemap and FIG. 2B illustrates a corresponding datastore suitcase created after optimizing a file X. Filemap file X 201 includes offset 203, index 205, and lname 207 fields. According to various embodiments, each segment in the filemap for file X is 8K in size. In particular embodiments, each data segment has an index of format <Datastore Suitcase ID>.<Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 207 is NULL in the filemap because each segment has not previously been referenced by any file.

FIG. 2B illustrates one example of a datastore suitcase corresponding to the filemap file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 251 includes three offset, reference count pairs which map to the data segments of the filemap file X 201. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 201 which was last to place a reference on the data A. Index 2 includes data B and a reference to File X 201 which was last to place a reference on the data B. Index 3 includes data C and a reference to File X 201 which was last to place a reference on the data C.

According to various embodiments, the dictionary is a key for the deduplication system. The dictionary is used to identify duplicate data segments and point to the location of the data segment. When numerous small data segments exist in a system, the size of a dictionary can become inefficiently large. Furthermore, when multiple optimizers nodes are working on the same data set they will each create their own dictionary. This approach can lead to suboptimal deduplication since a first node may have already identified a redundant data segment but a second node is not yet aware of it because the dictionary is not shared between the two nodes. Thus, the second node stores the same data segment as an original segment. Sharing the entire dictionary would be possible with a locking mechanism and a mechanism for coalescing updates from multiple nodes. However, such mechanisms can be complicated and adversely impact performance.

Consequently, a work partitioning scheme can be applied based on segment ID or hash value ranges for various data segments. Ranges of hash values are assigned to different nodes within the cluster. If a node is processing a data segment which has a hash value which maps to another node, it will contact the other node that owns the range to find out if the data segments already exist in a datastore.

Figure 3:
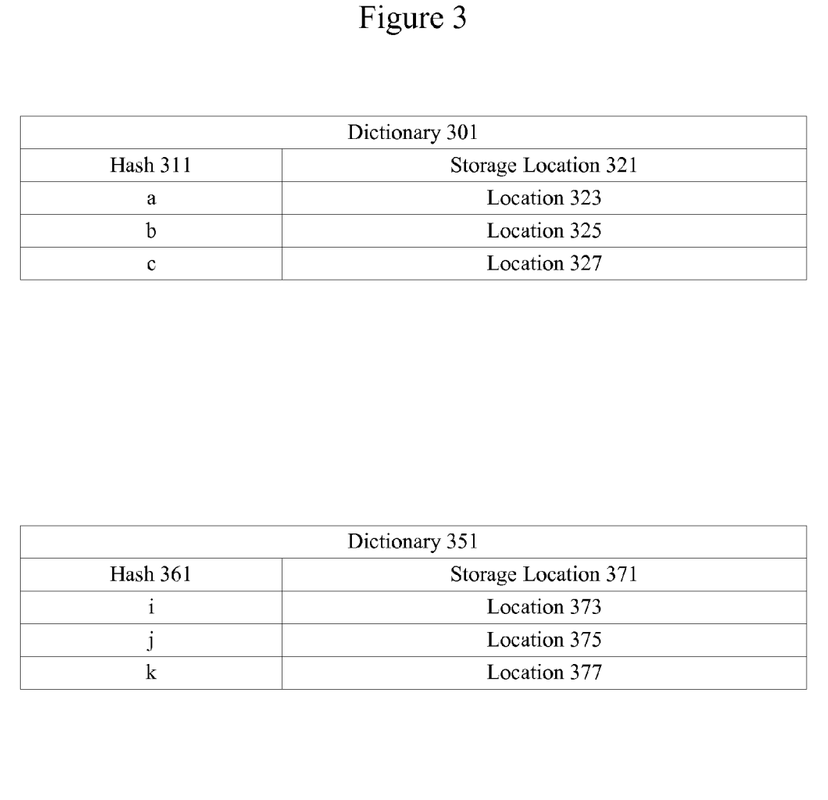
FIG. 3 illustrates a particular example of a deduplication dictionary.

FIG. 3 illustrates multiple dictionaries assigned to different segment ID or hash ranges. Although hash ranges are described, it should be recognized that the dictionary index can be hash ranges, reference values, or other types of keys. According to various embodiments, the hash values are SHA1 hash values. In particular embodiments, dictionary 301 is used by a first node and includes hash ranges from 0x0000 0000 0000 0000-0x0000 0000 FFFF FFFF. Dictionary 351 is used by a second node and includes hash ranges from 0x0000 0001 0000 0000-0X0000 0001 FFFF FFFF. Hash values 311 within the range for dictionary 301 are represented by symbols a, b, and c for simplicity. Hash values 361 within the range for dictionary 351 are represented by symbols i, j, and k for simplicity. According to various embodiments, each hash value in dictionary 301 is mapped to a particular storage location 321 such as location 323, 325, or 327. Each hash value in dictionary 351 is mapped to a particular storage location 371 such as location 373, 375, and 377.

Having numerous small segments increases the likelihood that duplicates will be found. However, having numerous small segments decreases the efficiency of using the dictionary itself as well as the efficiency of using associated filemaps and datastore suitcases.

Figure 4A:
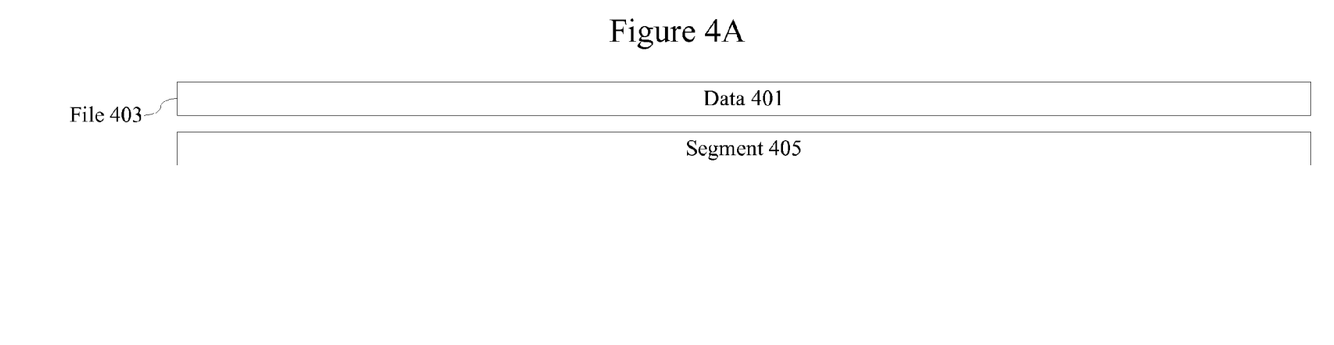
FIG. 4A illustrates a particular example of a file having a single data segment.

FIG. 4A illustrates one example of a non-container file. According to various embodiments, container files such as ZIP files, archives, productivity suite documents such as .docx, .xlsx, etc., include multiple objects of different types. Non-container files such as images and simple text files typically do not contain disparate objects.

According to various embodiments, it is recognized that certain types of non-container files do not benefit from having a segment size smaller than the size of the file itself. For example, many image files such as .jpg and .tiff files do not have many segments in common with other .jpg and .tiff files. Consequently, selecting small segments for such file types is inefficient. Consequently, the segment boundaries for an image file may be the boundaries for the file itself. For example, noncontainer data 401 includes file 403 of a type that does not benefit from finer grain segmentation. File types that do not benefit from finer grain segmentation include image files such as .jpg, .png, .gif, .and .bmp files. Consequently, file 403 is provided with a single segment 405. A single segment is maintained in the deduplication dictionary. Providing a single large segment encompassing an entire file can also make compression of the segment more efficient. According to various embodiments, multiple segments encompassing multiple files of the same type are compressed at the same time. In particular embodiments, only segments having data from the same type of file are compressed using a single compression context. It is recognized that specialized compressors may be applied to particular segments associated with the same file type.

Figure 4B:
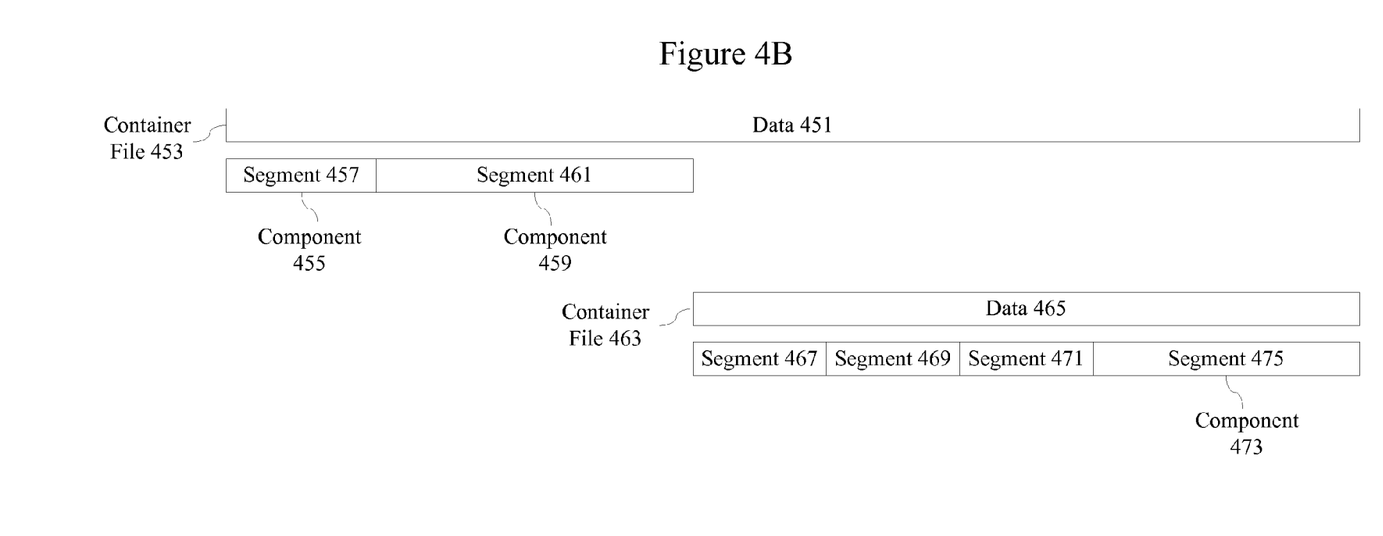
FIG. 4B illustrates a particular example of a file having multiple data segments and components.

FIG. 4B illustrates one example of a container file having multiple disparate objects. Data 451 includes a container file that does benefit from more intelligent segmentation. According to various embodiments, segmentation can be performed intelligently while allowing compression of multiple segments using a single compression context. Segmentation can be implemented in an intelligent manner for deduplication while improving compression efficiency. Instead of selecting a single segment size or using a sliding segment window, file 453 is delayered to extract file components. For example, a .docx file may include text, images, as well as other container files. For example, file 453 may include components 455, 459, and 463. Component 455 may be a component that does not benefit from finer grain segmentation and consequently includes only segment 457. Similarly, component 459 also includes a single segment 461. By contrast, component 463 is actually an embedded container file 463 that includes not only data that does benefit from additional segmentation but also includes another component 473. For example, data 465 may include text. According to various embodiments, the segment size for text may be a predetermined size or a dynamic or tunable size. In particular embodiments, text is separated into equal sized segments 467, 469, and 471. Consequently, data may also include a non-text object 473 that is provided with segment boundaries aligned with the object boundaries 475.

Figure 5:
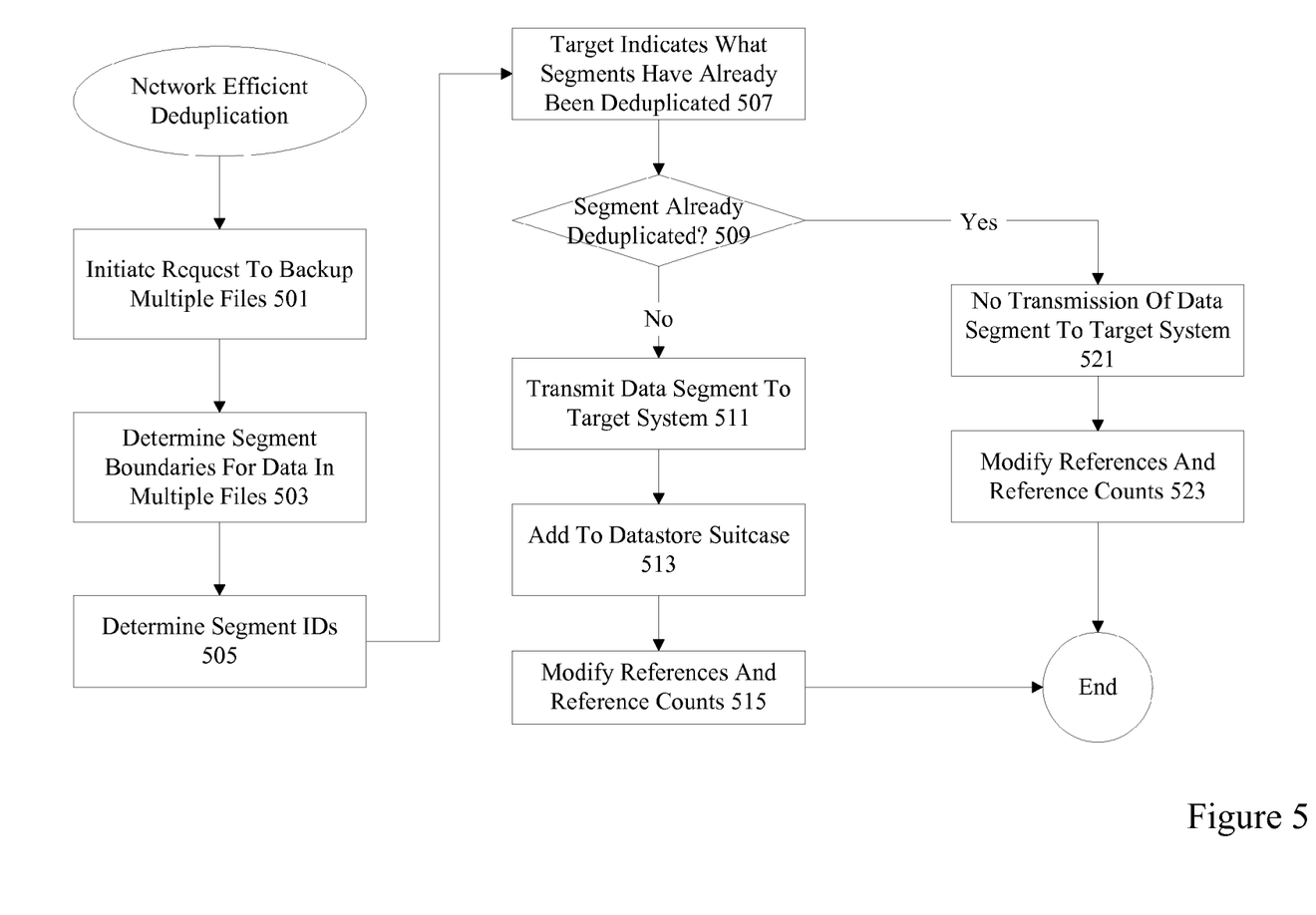
FIG. 5 illustrates a particular example of network efficient optimization.

FIG. 5 illustrates one technique for performing network efficient deduplication. At 501, a data management application at a host initiates a request to backup multiple files to a de-duplicating storage sub-system. If the source system is also a de-duplicating storage sub-system there will be a dictionary at the source system which contains segment IDs for all of the processed segments. The segment boundaries may have been determined based on data type after files are delayered 503. Segment sizes may have been determined using file type or characteristics of the data. The segment IDs are collected for the files the data management application wants to back up at 505.

A communication channel between the source and target systems is used by the source to send the segment IDs for the files that will be backed up to the target system. This communication does not have to involve the data management application as long as the source and target systems have implemented the mechanisms described herein. Upon receiving the source segment IDs, the target will respond specifying which segments the target already has 507. According to various embodiments, the determination can be made by comparing hashes of data segments with hashes in a deduplication dictionary at a source device. Data segment ID databases can also be provided at hosts, network devices, etc. According to various embodiments, deduplication involves modifying and/or creating filemaps, datastore suitcases, and deduplication dictionaries. If the data segment has not been deduplicated at 509, the data segment is transmitted to the target system at 511 for deduplication and is added to a datastore suitcase 513. References and reference counts are updated at 515. If the data segment has already been deduplicated, the segment need not be transmitted again and network resources are conserved at 521. In particular embodiments, references and reference counts are updated in associated filemaps and datastore suitcases at 523.

By not reduplicating data in the backup stream and by determining what data segments are already present on the target system, network bandwidth utilization for backup can be significantly reduced. Additionally the backup window can be reduced as well.

Figure 6:
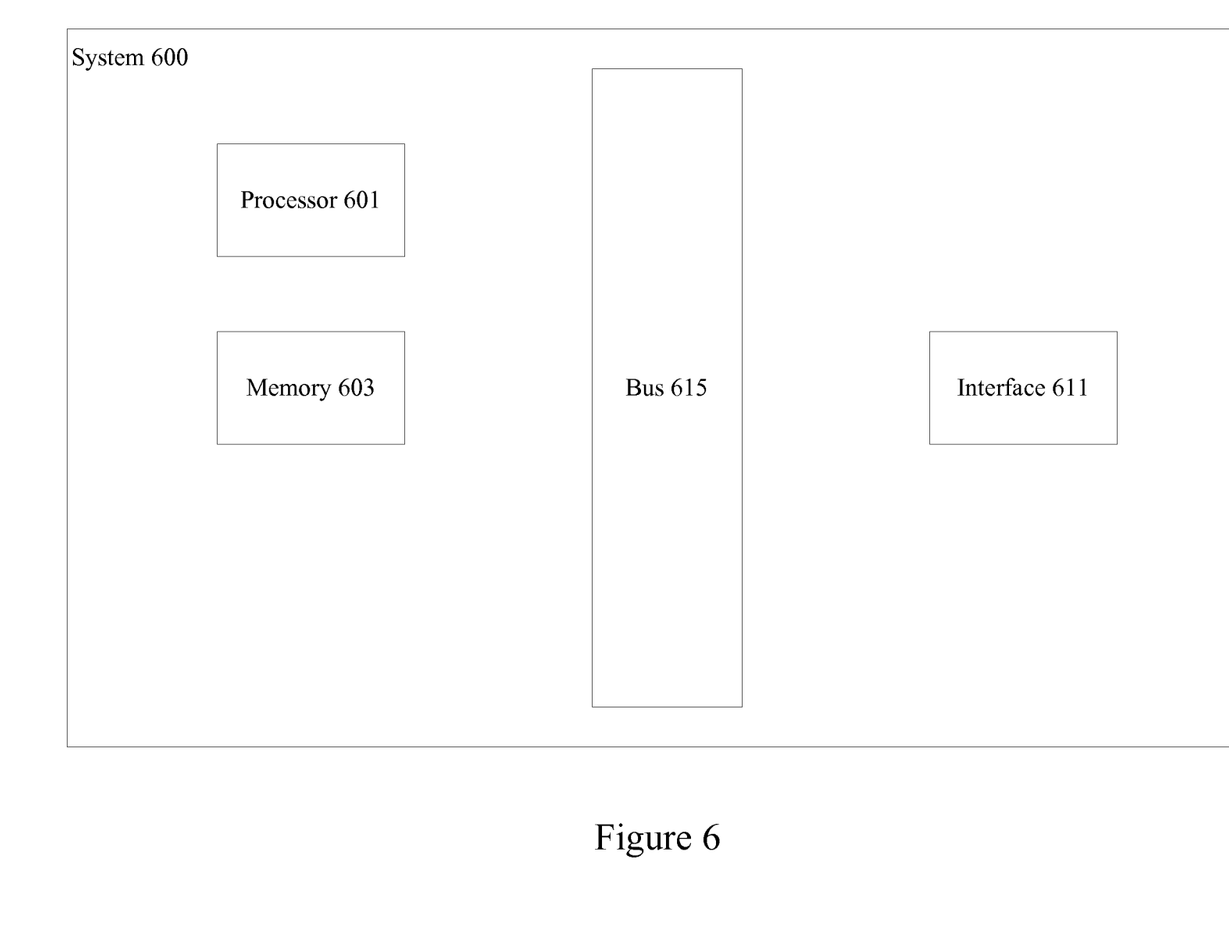
FIG. 6 illustrates a particular example of a computer system.

A variety of devices and applications can implement particular examples of network efficient deduplication. FIG. 6 illustrates one example of a computer system. According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:

receiving a request at a host to deduplicate a plurality of files, the host and a plurality of other hosts connected to a target system and a plurality of other target systems over a network, wherein the host communicates over the network with the target system by using a file level protocol, wherein the target system is a file server;

determining at the host whether segments in the plurality of files have already been deduplicated at the target system in a deduplication system by comparing segment identifiers (segment IDs) for the segments to match segment IDs for segments already deduplicated, wherein segment IDs are evaluated by transmitting segment IDs to the target system to compare the segment IDs with entries in a deduplication dictionary;

transmitting a first plurality of segments over a network to the target system by using the file level protocol, the first plurality of segments not already deduplicated at the target system, and not transmitting a second plurality of segments to the target system to reduce network bandwidth utilization, the second plurality of segments already deduplicated at the target system;

modifying references and reference counts at the target system for the first plurality of segments and the second plurality of segments, wherein modifying references and reference counts includes modifying a filemap, dictionaries, and a datastore suitcase for both already deduplicated and not already deduplicated segments;

wherein the dictionary is used to identify duplicate data segments and point to the location of the data segments, the datastore suitcase includes an index portion and a data portion to allow a system to perform a bulk read of the index portion to obtain offset data to allow parallel reads of large amounts of data in the data section and further includes three offset, reference count pairs which map to the data segments of the filemap file.

2. The method of claim 1, wherein the plurality of segments span a plurality of files.

3. The method of claim 1, wherein the plurality of files are determined to be container or non-container files based on the file types associated with the files.

4. The method of claim 1, wherein the second plurality of segments already deduplicated correspond to a plurality of filemaps.

5. The method of claim 1, wherein the second plurality of segments already deduplicated correspond to a plurality of datastore suitcases.

6. The method of claim 5, wherein a datastore suitcase in the plurality of datastore suitcases further comprises a plurality of reference counts corresponding to the plurality of deduplicated data segments.

7. The method of claim 1, wherein segment IDs are evaluated using a segment ID database at the host.

8. The method of claim 1, wherein modifying references and reference counts at the target system for the first plurality of segments and a second plurality of segments comprises.

9. An apparatus, comprising:

an input interface configured to receive a request to deduplicate a plurality of files, the host and a plurality of other hosts connected to a target system and a plurality of other target systems over a network, wherein the host communicates over the network with the target system by using a file level protocol, wherein the target system is a file server;

a processor configured to determine at the host whether segments in the plurality of files have already been deduplicated at the target system in a deduplication system by comparing segment identifiers (segment IDs) for the segments to match segment IDs for segments already deduplicated, wherein segment IDs are evaluated by transmitting segment IDs to the target system to compare the segment IDs with entries in a deduplication dictionary;

an output interface configured to transmit a first plurality of segments over a network to the target system by using the file level protocol, the first plurality of segments not already deduplicated at the target system, and not transmitting a second plurality of segments to the target system to reduce network bandwidth utilization, the second plurality of segments already deduplicated at the target system;

wherein references and reference counts at the target system are modified for the first plurality of segments and the second plurality of segments, wherein modifying references and reference counts includes modifying a filemap, dictionaries, and a datastore suitcase for both already deduplicated and not already deduplicated segments;

wherein the dictionary is used to identify duplicate data segments and point to the location of the data segments, the datastore suitcase includes an index portion and a data portion to allow a system to perform a bulk read of the index portion to obtain offset data to allow parallel reads of large amounts of data in the data section and further includes three offset, reference count pairs which map to the data segments of the filemap file.

10. The apparatus of claim 9, wherein the plurality of segments span a plurality of files.

11. The apparatus of claim 9, wherein the plurality of files are determined to be container or non-container files based on the file types associated with the files.

12. The apparatus of claim 9, wherein the second plurality of segments already deduplicated correspond to a plurality of filemaps.

13. The apparatus of claim 9, wherein the second plurality of segments already deduplicated correspond to a plurality of datastore suitcases.

14. The apparatus of claim 13, wherein a datastore suitcase in the plurality of datastore suitcases further comprises a plurality of reference counts corresponding to the plurality of deduplicated data segments.

15. The apparatus of claim 9, wherein segment IDs are evaluated using a segment ID database at the host.

16. A non-transitory computer readable medium, comprising:

computer code for receiving a request at a host to deduplicate a plurality of files, the host and a plurality of other hosts connected to a target system and a plurality of other target systems over a network, wherein the host communicates over the network with the target system by using a file level protocol, wherein the target system is a file server;

computer code for determining at the host whether segments in the plurality of files have already been deduplicated at the target system in a deduplication system by comparing segment identifiers (segment IDs) for the segments to match segment IDs for segments already deduplicated, wherein segment IDs are evaluated by transmitting segment IDs to the target system to compare the segment IDs with entries in a deduplication dictionary;

computer code for transmitting a first plurality of segments over a network to the target system by using the file level protocol, the first plurality of segments not already deduplicated at the target system, and not transmitting a second plurality of segments to the target system to reduce network bandwidth utilization, the second plurality of segments already deduplicated at the target system;

computer code for modifying references and reference counts at the target system for the first plurality of segments and the second plurality of segments, wherein modifying references and reference counts includes modifying a filemap, dictionaries, and a datastore suitcase for both already deduplicated and not already deduplicated segments;

wherein the dictionary is used to identify duplicate data segments and point to the location of the data segments, the datastore suitcase includes an index portion and a data portion to allow a system to perform a bulk read of the index portion to obtain offset data to allow parallel reads of large amounts of data in the data section and further includes three offset, reference count pairs which map to the data segments of the filemap file.

* * * * *